(12) United States Patent
Ichitsuka

(10) Patent No.: US 11,671,495 B2
(45) Date of Patent: Jun. 6, 2023

(54) INFORMATION PROCESSING SYSTEM, INFORMATION PROCESSING METHOD AND RECORDING MEDIUM RECORDING INFORMATION PROCESSING PROGRAM FOR PRESENTING SPECIFIC INFORMATION TO A USER TERMINAL

(71) Applicant: SHARP KABUSHIKI KAISHA, Sakai (JP)

(72) Inventor: Takahiro Ichitsuka, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/555,191

(22) Filed: Dec. 17, 2021

(65) Prior Publication Data

US 2022/0210227 A1 Jun. 30, 2022

(30) Foreign Application Priority Data

Dec. 28, 2020 (JP) .............................. JP2020-218957

(51) Int. Cl.
*H04L 67/1097* (2022.01)
*H04L 67/02* (2022.01)
*H04L 69/16* (2022.01)
*H04L 9/40* (2022.01)

(52) U.S. Cl.
CPC .......... *H04L 67/1097* (2013.01); *H04L 63/08* (2013.01); *H04L 67/02* (2013.01); *H04L 69/162* (2013.01)

(58) Field of Classification Search
CPC ..... H04L 63/08; H04L 67/02; H04L 67/1097; H04L 69/162
See application file for complete search history.

(56) References Cited

U.S. PATENT DOCUMENTS

| | | | |
|---|---|---|---|
| 8,880,687 B1* | 11/2014 | Chandrachari | H04L 41/0816 709/224 |
| 10,769,045 B1* | 9/2020 | Sharifi Mehr | G06F 21/552 |
| 2011/0022642 A1* | 1/2011 | deMilo | G06F 16/122 707/805 |
| 2015/0370847 A1* | 12/2015 | Kondoh | G06F 17/40 707/691 |
| 2017/0324813 A1* | 11/2017 | Jain | H04L 41/5009 |
| 2018/0007027 A1* | 1/2018 | Chizhov | H04W 12/30 |
| 2021/0096776 A1* | 4/2021 | Kim | G06F 3/067 |
| 2021/0103498 A1* | 4/2021 | Yoshimura | G06F 11/1464 |

FOREIGN PATENT DOCUMENTS

JP 2017-187818 A 10/2017

* cited by examiner

*Primary Examiner* — Jeong S Park
(74) *Attorney, Agent, or Firm* — ScienBiziP, P.C.

(57) ABSTRACT

An information processing system includes: a setting processing processor that registers, based on setting information acquired from a storage device through a first communication path, the storage device as a storage device capable of presenting specific information to a user terminal; an acquisition processing processor that acquires, when the storage device is registered by the setting processing processor, the specific information corresponding to a request acquired from the user terminal, through a second communication path different from the first communication path; and a presentation processing processor that presents the specific information acquired with the acquisition processing processor to the user terminal.

9 Claims, 9 Drawing Sheets

FIG. 9

MANAGEMENT PAGE (P3)

| SERVICE ID | ADDITION OF SERVICE ID |
|---|---|
| SERVICE ID | ***** |
| NAS USER | ***** |

[EDIT] [DELETE]

FIG. 10

LOGIN (P4)

ID _____

PASSWORD _____

[LOGIN]

INFORMATION PROCESSING SYSTEM, INFORMATION PROCESSING METHOD AND RECORDING MEDIUM RECORDING INFORMATION PROCESSING PROGRAM FOR PRESENTING SPECIFIC INFORMATION TO A USER TERMINAL

INCORPORATION BY REFERENCE

This application is based upon and claims the benefit of priority from the corresponding Japanese Patent Application No. 2020-218957 filed on Dec. 28, 2020, the entire contents of which are incorporated herein by reference.

BACKGROUND OF THE INVENTION

Field of the Invention

The present disclosure relates to information processing systems, information processing methods and recording media which record information processing programs.

Description of the Background Art

Conventionally, a system is known which performs, through the Internet, data communication between a NAS (storage device) connected to a network such as a LAN and a user terminal such as a personal computer (PC) or a smart phone. For example, the system described above includes a router which relays between the NAS and the user terminal, and opens the port of the router to perform the data communication.

However, in the conventional technique, the port of the router is opened, and thus the security of information stored in the NAS is lowered. In order to enhance the security, security measures need to be performed such as by installing security software or setting a port number for allowing access, with the result that the management cost is disadvantageously increased.

SUMMARY

An object of the present disclosure is to provide an information processing system which can present, while retaining the security of specific information stored in a storage device with a simple configuration, the specific information to a user terminal, an information processing method and a recording medium which records an information processing program.

An information processing system according to an aspect of the present disclosure is an information processing system that presents specific information stored in a storage device to a user terminal, and includes: a setting circuit that registers, based on setting information acquired from the storage device through a first communication path, the storage device as a storage device capable of presenting the specific information to the user terminal; an acquisition circuit that acquires, when the storage device is registered by the setting circuit, the specific information corresponding to a request acquired from the user terminal, through a second communication path different from the first communication path; and a presentation circuit that presents the specific information acquired with the acquisition circuit to the user terminal.

An information processing method according to another aspect of the present disclosure is an information processing method that presents specific information stored in a storage device to a user terminal, and one or a plurality of processors execute: registering, based on setting information acquired from the storage device through a first communication path, the storage device as a storage device capable of presenting the specific information to the user terminal; acquiring, when the storage device is registered by the registering of the storage device, the specific information corresponding to a request acquired from the user terminal, through a second communication path different from the first communication path; and presenting the specific information acquired by the acquiring of the specific information to the user terminal.

A recording medium according to another aspect of the present disclosure records an information processing program for presenting specific information stored in a storage device to a user terminal and for instructing one or a plurality of processors to execute: registering, based on setting information acquired from the storage device through a first communication path, the storage device as a storage device capable of presenting the specific information to the user terminal; acquiring, when the storage device is registered by the registering of the storage device, the specific information corresponding to a request acquired from the user terminal, through a second communication path different from the first communication path; and presenting the specific information acquired by the acquiring of the specific information to the user terminal.

According to the present disclosure, there are provided an information processing system which can present, while retaining the security of specific information stored in a storage device with a simple configuration, the specific information to a user terminal, an information processing method and a recording medium which records an information processing program.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a diagram showing an example of the display screen of the user terminal in the embodiment of the present disclosure.

FIG. 8 is a diagram showing an example of the display screen of the user terminal in the embodiment of the present disclosure.

FIG. 9 is a diagram showing an example of the display screen of the user terminal in the embodiment of the present disclosure.

FIG. 10 is a diagram showing an example of the display screen of the user terminal in the embodiment of the present disclosure.

DETAILED DESCRIPTION

Embodiments of the present disclosure will be described below with reference to accompanying drawings. The following embodiments are examples obtained by embodying the present disclosure, and are not intended to limit the technical scope of the present disclosure.

Information Processing System 100

Figure 1:
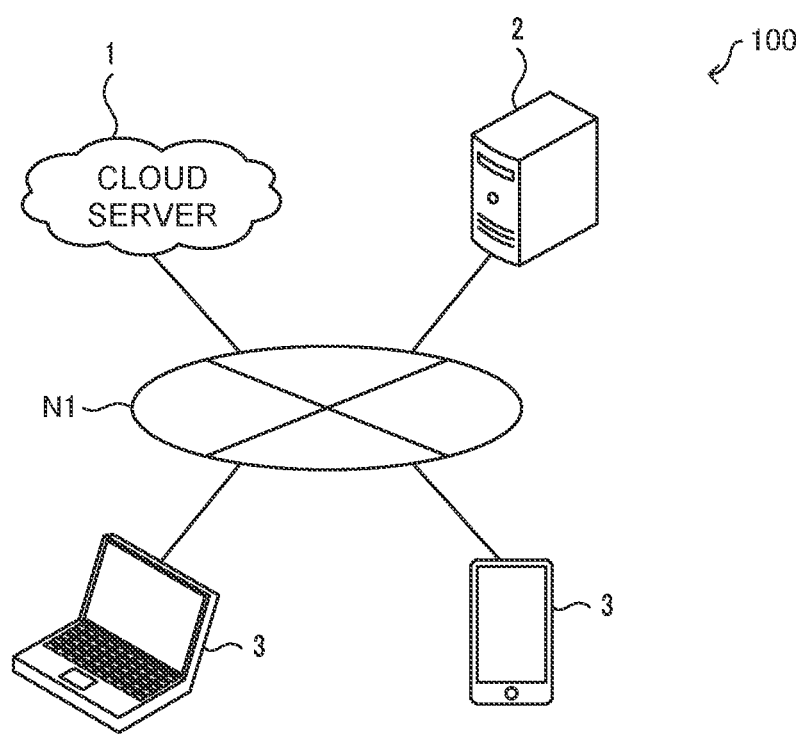
FIG. 1 is a schematic view showing a schematic configuration of an information processing system according to an embodiment of the present disclosure.

FIG. 1 is a diagram showing a schematic configuration of an information processing system 100 according to an embodiment of the present disclosure. The information processing system 100 includes a cloud server 1, a Network attached storage (NAS) 2 and a user terminal 3.

The cloud server 1 is constructed with, for example, one or a plurality of servers (virtual servers). The NAS 2 is a data server (file server) which is connected to a network (LAN). The user terminal 3 is a terminal device such as a personal computer or a smart phone. In FIG. 1, two user terminals 3 are illustrated. The cloud server 1 is an example of a server in the present disclosure, and the NAS 2 is an example of a storage device in the present disclosure.

The cloud server 1, the NAS 2 and the user terminal 3 are connected to each other through a network N1. The network N1 is a communication network such as the Internet.

The information processing system 100 is a system which presents specific information (such as file data or a search result) stored in the NAS 2 to the user terminal 3. Specifically, the cloud server 1 constructs a secure communication path (for example, a WebSocket communication path) with the NAS 2, acquires, from the NAS 2, the specific information corresponding to a request from a user and transmits it to the user terminal 3. The cloud server 1 performs service for providing the specific information to the user. The user utilizes the user terminal 3 to install an application corresponding to the service, and thereby can utilize the service. In this way, the information processing system 100 can present the specific information to the user terminal 3 while retaining the security of the specific information stored in the NAS 2.

Cloud Server 1

Figure 2:
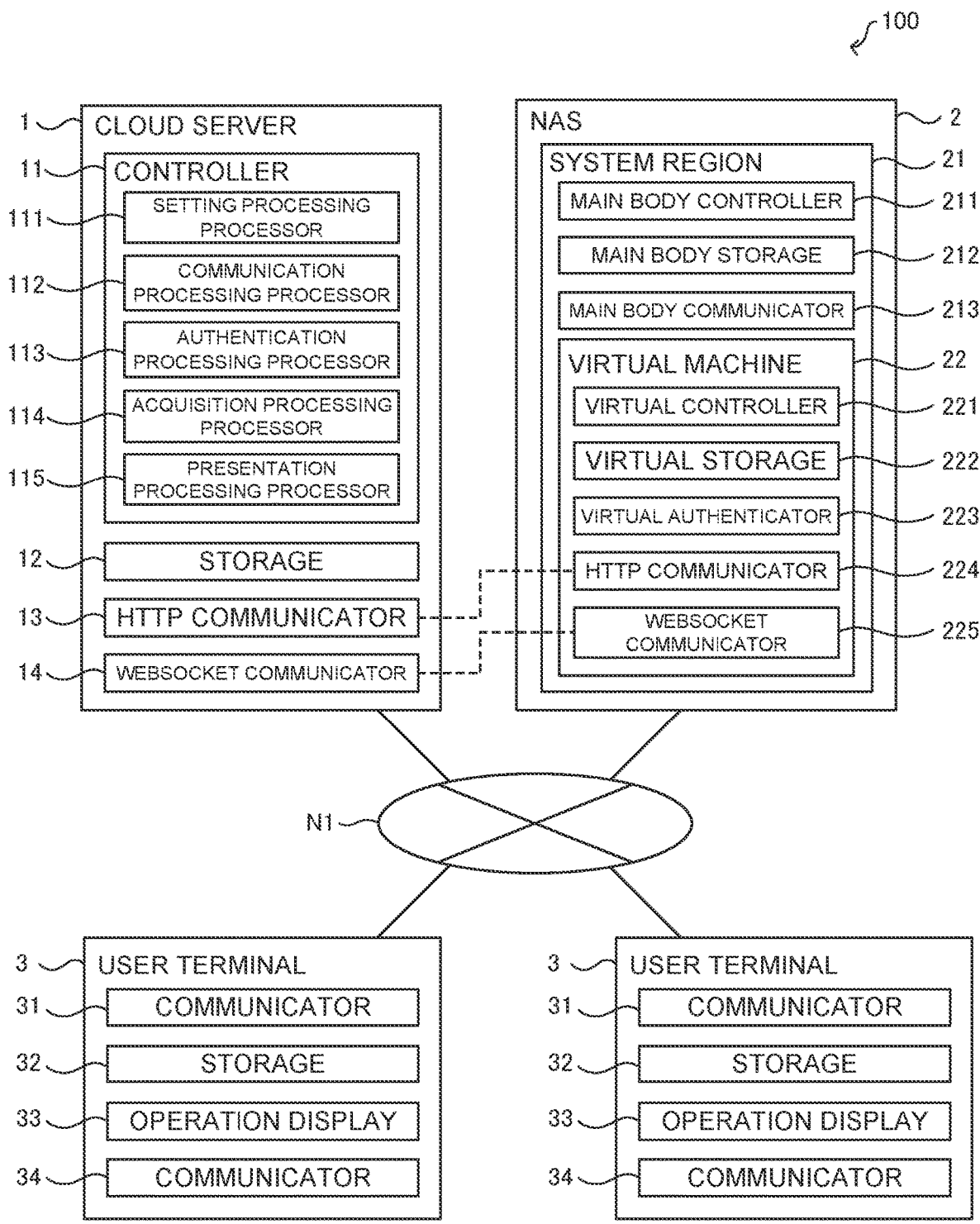
FIG. 2 is a functional block diagram showing the configuration of the information processing system according to the embodiment of the present disclosure.

As shown in FIG. 2, the cloud server 1 includes a controller 11, a storage 12, an HTTP communicator 13, a WebSocket communicator 14 and the like. The cloud server 1 is one or a plurality of virtual servers. The server in the present disclosure is not limited to a cloud server and may be one or a plurality of physical servers.

The HTTP communicator 13 is a communication interface which connects the cloud server 1 to the network N1 by wired or wireless connection and performs, through the network N1, with the NAS 2, data communication corresponding to an HTTP communication protocol. The HTTP communicator 13 of the cloud server 1 is connected to the HTTP communicator 224 of the NAS 2 to construct an HTTP communication path between the cloud server 1 and the NAS 2.

The WebSocket communicator 14 is a communication interface which connects the cloud server 1 to the network N1 by wired or wireless connection and performs, through the network N1, with the NAS 2, data communication corresponding to a WebSocket communication protocol. The WebSocket communicator 14 of the cloud server 1 is connected to the WebSocket communicator 225 of the NAS 2 to construct a WebSocket communication path between the cloud server 1 and the NAS 2. In general, the WebSocket communication path is more secure than the HTTP communication path. The HTTP communication path is an example of a first communication path in the present disclosure, and the WebSocket communication path is an example of a second communication path in the present disclosure.

The storage 12 is a nonvolatile storage, such as an HDD (Hard Disk Drive), an SSD (Solid State Drive) or a flash memory, which stores various types of information. In the storage 12, control programs for instructing the controller 11 to execute setting processing (see FIG. 13) and information presentation processing (see FIG. 14) which will be described later. For example, the control programs are non-transitorily recorded in a computer readable recording medium such as a CD or a DVD, are read with a reading device (not shown) such as a CD drive or a DVD drive included in the cloud server 1 and are stored in the storage 12. The control programs may be distributed from another server to be stored in the storage 12.

The controller 11 includes control devices such as a CPU, a ROM and a RAM. The CPU is a processor which executes various types of computation processing. The ROM previously stores control programs, such as a BIOS and an OS, for instructing the CPU to execute various types of processing. The RAM stores various types of information and is used as a temporary storage memory (workspace) for various types of processing executed by the CPU. The controller 11 causes the CPU to execute various types of control programs previously stored in the ROM or the storage 12 so as to control the cloud server 1.

Specifically, the controller 11 includes various types of processing processors such as a setting processing processor 111, a communication processing processor 112, an authentication processing processor 113, an acquisition processing processor 114 and a presentation processing processor 115. The controller 11 executes various types of processing corresponding to the control programs to function as the various types of processing processors. Part or all of the processing processors included in the controller 11 may be formed with an electronic circuit. The control programs may be programs for causing a plurality of processors to function as the various types of processing processors.

Based on setting information acquired from the NAS 2 through the HTTP communication path, the setting processing processor 111 registers the NAS 2 as a device (storage device) capable of presenting the specific information to the user terminal 3. Specifically, the setting processing processor 111 executes registration processing which opens one tenant corresponding to one NAS 2, utilizes the HTTP communication path to acquire the setting information and thereby registers the NAS 2 as the tenant. The setting information includes, for example, a PIN code for registering the NAS 2 as the tenant. A specific example of the registration processing will be described later. The setting processing processor 111 is an example of a setting processing processor in the present disclosure.

When the NAS 2 is registered by the setting processing processor 111, the communication processing processor 112 constructs the WebSocket communication path. Specifically, when the NAS 2 is registered by the setting processing processor 111, the communication processing processor 112 issues a token (first authentication information in the present disclosure) unique to the NAS 2, thereafter acquires, from the NAS 2, a request to construct the WebSocket communication path and constructs the WebSocket communication path when a token corresponding to the request to construct the WebSocket communication path agrees with the issued token. A specific example of a method of constructing the WebSocket communication path will be described later. The communication processing processor 112 is an example of a communication processing processor in the present disclosure.

When the WebSocket communication path is constructed, the setting processing processor 111 registers device information (NAS information) on the NAS 2 in the storage 12. The NAS information includes, for example, pieces of information such as a product name, a name, an IP address, a search IP address, a MAC address, an S/N, an installation site and a connection status (see FIG. 7). When the WebSocket communication path is constructed, and the NAS information is registered, the cloud server 1 allows the utilization of the NAS 2 in the service.

The authentication processing processor 113 executes authentication processing for the user of the user terminal 3. In processing for constructing the WebSocket communication path, the user previously registers a service ID for utilizing the service provided by the cloud server 1. The user also previously registers a password for utilizing the service. The service ID and the password are stored in the storage 12. When in the utilization of the service, the user inputs the service ID and the password in the user terminal 3, the authentication processing processor 113 checks the service ID and the password. When the service ID and the password which are input agree with the service ID and the password stored in the storage 12, the authentication processing processor 113 authenticates the user to allow the utilization of the service.

When the NAS 2 is registered by the setting processing processor 111, the acquisition processing processor 114 acquires, through the WebSocket communication path, the specific information corresponding to the request acquired from the user terminal 3. Specifically, when the user is authenticated by the authentication processing processor 113, the acquisition processing processor 114 acquires the specific information through the WebSocket communication path. As described above, the acquisition processing processor 114 acquires the specific information by utilization of the WebSocket communication path without use of the HTTP communication path.

The presentation processing processor 115 presents the specific information acquired with the acquisition processing processor 114 to the user terminal 3. For example, when the user selects file search service as the service described above, the acquisition processing processor 114 acquires a search result from the NAS 2, and the presentation processing processor 115 transmits the data of a search result page to the user terminal 3. For example, when the user selects folder opening (remote) service as the service (for example, clicks an icon of "open a folder" in a service list page P5 shown in FIG. 11), the acquisition processing processor 114 acquires a list in a shared route folder from the NAS 2, and the presentation processing processor 115 transmits the list in the shared route folder to the user terminal 3. For example, when the user selects, after the service is performed, service for acquiring a folder/file list within the shared route folder, the acquisition processing processor 114 acquires the folder/file list within the shared route folder from the NAS 2, and the presentation processing processor 115 transmits the folder/file list within the shared route folder to the user terminal 3. For example, when the user selects, after the service is performed, service for downloading the folder/file, the acquisition processing processor 114 acquires file/folder data from the NAS 2, and the presentation processing processor 115 transmits the file/folder data to the user terminal 3. For example, when the user selects service for uploading the folder/file, the acquisition processing processor 114 acquires the file/folder data from the user terminal 3 to transmit the file/folder data to the NAS 2, and the presentation processing processor 115 transmits the result of the transmission to the user terminal 3. For example, when the user selects service for deleting the folder/file, the NAS 2 deletes the file/folder data, and the presentation processing processor 115 transmits the result of the performance of the service to the user terminal 3. For example, the user can move/rename the file/folder data as in the service. The search result and the file/folder data are examples of specific information in the present disclosure.

Figure 3:
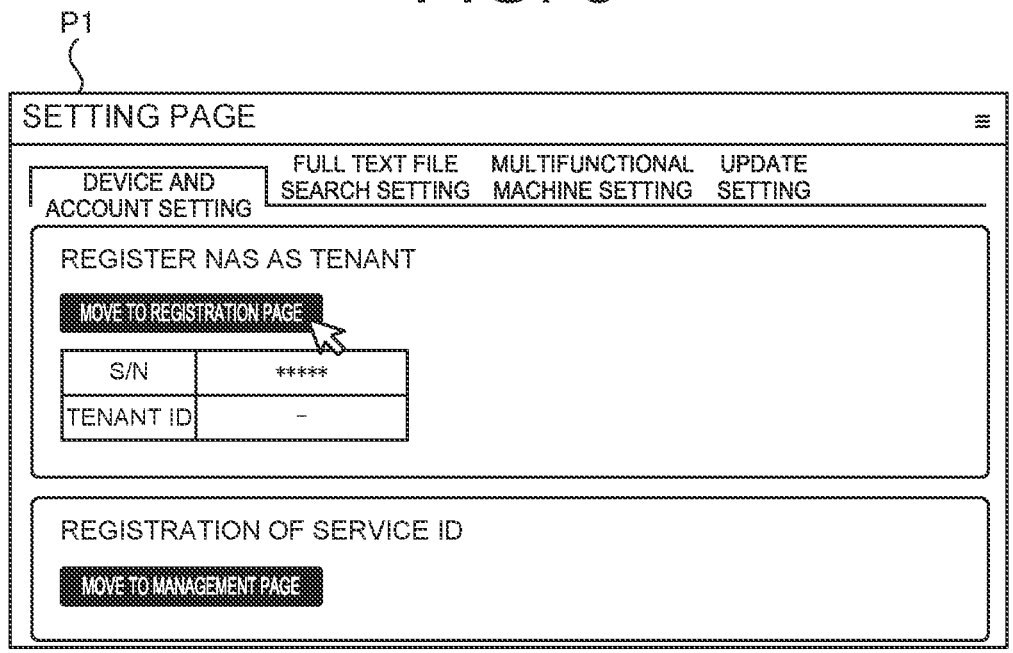
FIG. 3 is a diagram showing an example of the display screen of a user terminal in the embodiment of the present disclosure.
Figure 4:
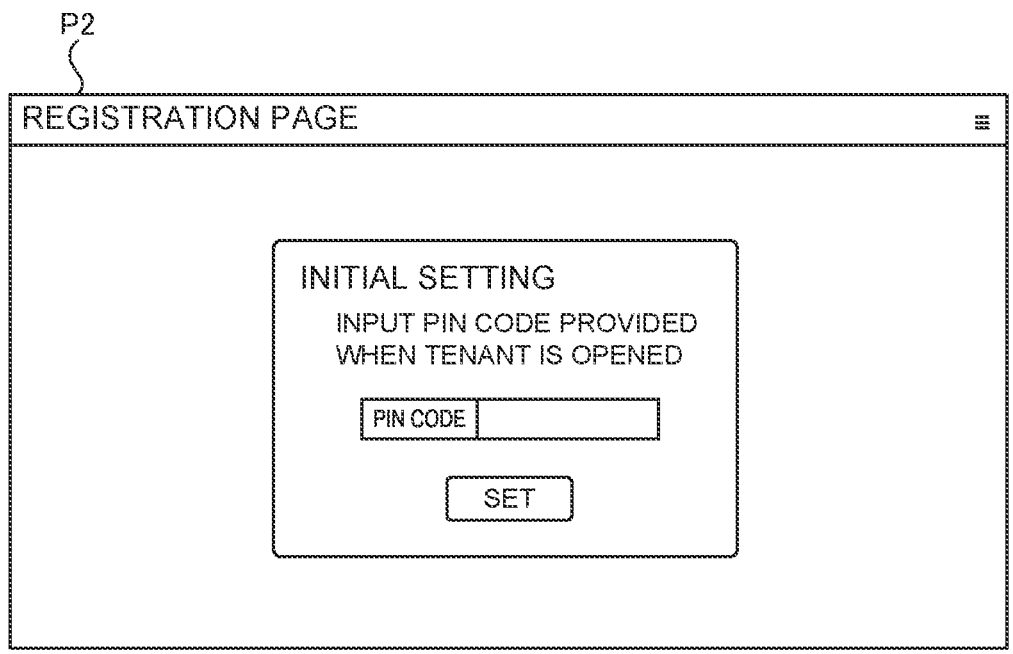
FIG. 4 is a diagram showing an example of the display screen of the user terminal in the embodiment of the present disclosure.

In the storage 12, a setting page P1 (see FIGS. 3 and 6), a registration page P2 (see FIGS. 4 and 5) and a management page P3 (see FIGS. 7 to 9) for registering the NAS 2 are stored. In the storage 12, a login page P4 (see FIG. 10) for utilizing the service, a service list page P5 (see FIG. 11) which is presented to the user in the service, a cooperative device page P6 (see FIG. 12) and a specific information page (not shown) are also stored. The controller 11 transmits, to the user terminal 3, the data of various types of pages stored in the storage 12 to cause the user terminal 3 to display the data.

NAS 2

As shown in FIG. 2, the NAS 2 includes a system region 21 (also referred to as a controller 21). The system region 21 includes a main body controller 211, a main body storage 212, a main body communicator 213, a virtual machine 22 and the like. The main body controller 211 comprehensively controls the main body storage 212 and the main body communicator 213. The virtual machine 22 includes a virtual controller 221, a virtual storage 222, a virtual authenticator 223, the HTTP communicator 224, the WebSocket communicator 225 and the like. The virtual controller 221 comprehensively controls the virtual storage 222, the virtual authenticator 223, the HTTP communicator 224 and the WebSocket communicator 225.

The main body communicator 213 is a communication interface which connects the NAS 2 to the network N1 by wired or wireless connection and performs, through the network N1, with an external device (for example, the user terminal 3), data communication corresponding to a predetermined communication protocol.

In the main body storage 212, the device information (NAS information), a NAS user name and a NAS password on the NAS 2, the specific information (such as search data and file data) and the like are stored.

The HTTP communicator 224 is a communication interface which connects the NAS 2 to the network N1 by wired or wireless connection and performs, through the network N1, with the cloud server 1, data communication corresponding to the HTTP communication protocol. The HTTP communicator 224 of the NAS 2 is connected to the HTTP communicator 13 of the cloud server 1 to construct the HTTP communication path between the cloud server 1 and the NAS 2. The HTTP communicator 224 is an example of a first communicator in the present disclosure.

The WebSocket communicator 225 is a communication interface which connects the NAS 2 to the network N1 by wired or wireless connection and performs, through the network N1, with the cloud server 1, data communication corresponding to the WebSocket communication protocol. The WebSocket communicator 225 of the NAS 2 is connected to the WebSocket communicator 14 of the cloud server 1 to construct the WebSocket communication path between the cloud server 1 and the NAS 2. The WebSocket communicator 225 is an example of a second communicator in the present disclosure.

In the virtual storage 222, the token (the first authentication information in the present disclosure) acquired from the cloud server 1 is stored.

The virtual controller 221 transmits the request to construct the WebSocket communication path to the cloud server 1. Specifically, when the virtual controller 221 acquires the token from the virtual storage 222, the virtual controller 221 utilizes the HTTP communication path to transmit the request to construct the WebSocket communication path including the token to the cloud server 1.

The main body controller 211 transmits the NAS information to the cloud server 1. Specifically, when the main body controller 211 acquires the NAS information from the main body storage 212, the main body controller 211 utilizes the HTTP communication path to transmit the NAS information to the cloud server 1.

The virtual controller 221 utilizes the WebSocket communication path to transmit the specific information corresponding to the request from the user to the cloud server 1. Specifically, for example, when the main body controller 211 acquires a search request from the cloud server 1, the main body controller 211 acquires data (search result) corresponding to the search request from the main body storage 212. The virtual controller 221 utilizes the WebSocket communication path to transmit the data of the search result to the cloud server 1.

Figure 11:
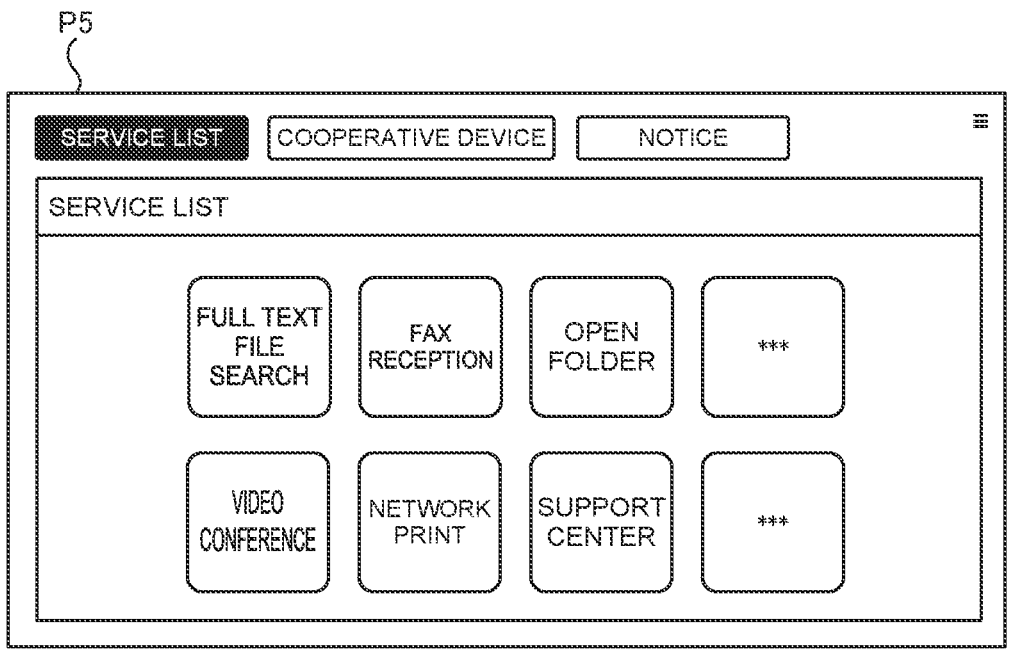
FIG. 11 is a diagram showing an example of the display screen of the user terminal in the embodiment of the present disclosure.
Figure 12:
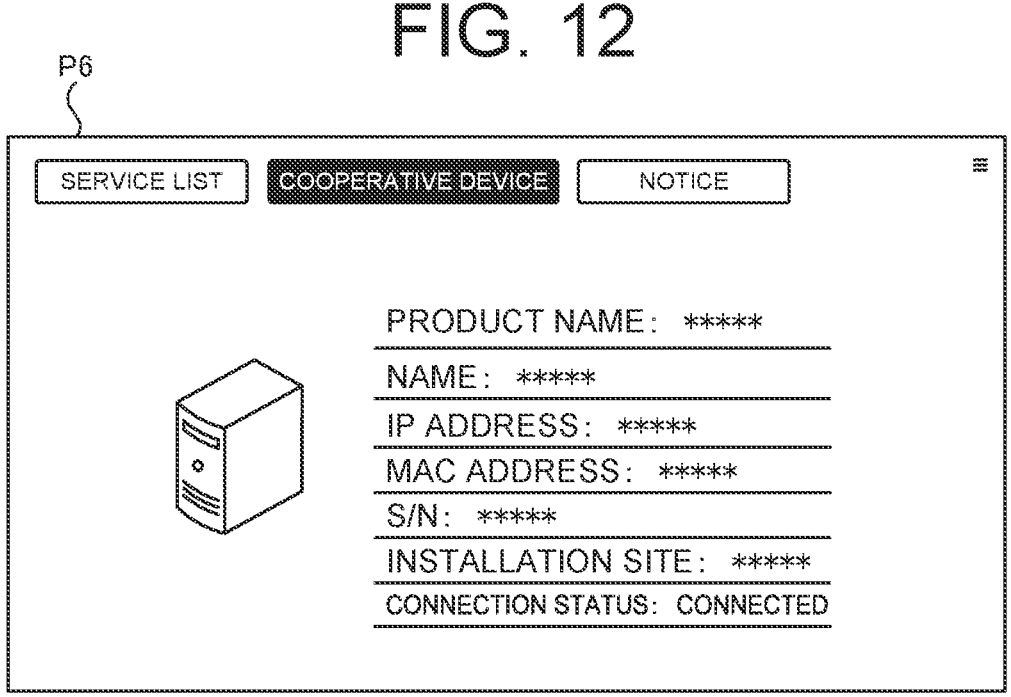
FIG. 12 is a diagram showing an example of the display screen of the user terminal in the embodiment of the present disclosure.

When the user selects the folder opening (remote) service (for example, clicks the icon of "open a folder" in the service list page P5 shown in FIG. 11), the virtual authenticator 223 authenticates the user terminal 3. The user previously registers the NAS user name for utilizing the service. The user also previously registers the NAS password for utilizing the service. The NAS user name and the NAS password are stored in the main body storage 212. When in the utilization of the service, the user inputs the NAS user name and the NAS password in the user terminal 3, the token corresponding to the NAS user name and the NAS password which are input are transmitted to the NAS 2 with the WebSocket communication path, and the virtual authenticator 223 transmits the transmitted token to the cloud server 1 with the HTTP communication path. The cloud server 1 transmits the NAS user name corresponding to the transmitted token to the NAS 2. When the NAS user name and the NAS password agree with the NAS user name and the NAS password stored in the main body storage 212, the virtual authenticator 223 authenticates the user to allow the utilization of the service.

As described above, the NAS 2 utilizes the HTTP communication path connected to the HTTP communicator 224 within the virtual machine 22 to transmit the setting information to the cloud server 1. The NAS 2 includes the virtual machine 22, and utilizes the WebSocket communication path connected to the WebSocket communicator 225 within the virtual machine 22 to transmit the specific information stored in the system region 21 to the cloud server 1. Thus, it is possible to prevent the leakage of the specific information to enhance the security.

User Terminal 3

As shown in FIG. 2, the user terminal 3 includes a controller 31, a storage 32, an operation display 33, a communicator 34 and the like. Although FIG. 2 illustrates two user terminals 3, in the present disclosure, the number of user terminals 3 is not limited. The user terminal 3 may have a known configuration.

The communicator 34 is a communication interface which connects the user terminal 3 to the network N1 by wired or wireless connection and performs, through the network N1, with another device (such as the cloud server 1 or the NAS 2), data communication corresponding to a predetermined communication protocol.

The operation display 33 is a user interface which includes a display, such as a liquid crystal display or an organic EL display, that displays various types of information and an operator, such as a mouse, a keyboard or a touch panel, that receives an operation. The operation display 33 receives, for example, an operation performed by the user of the user terminal 3. The operation display 33 displays, according to the application corresponding to the service, various types of pages acquired from the cloud server 1 (the setting page P1 (see FIGS. 3 and 6), the registration page P2 (see FIGS. 4 and 5), the management page P3 (see FIGS. 7 to 9), the login page P4 (see FIG. 10), the service list page P5 (see FIG. 11), the cooperative device page P6 (see FIG. 12), the specific information page (not shown) and the like).

The storage 32 is a nonvolatile storage, such as an HDD, an SSD or a flash memory, which stores various types of information. In the storage 32, control programs for instructing the controller 31 to execute various types of control processing are stored. For example, the control programs are non-transitorily recorded in a computer readable recording medium such as a CD or a DVD, are read with a reading device (not shown) such as a CD drive or a DVD drive included in the user terminal 3 and are stored in the storage 32. The control programs may be distributed from the cloud server 1 to be stored in the storage 32.

In the present embodiment, the application corresponding to the service is installed in the user terminal 3 and is stored in the storage 32. In another embodiment, the application may be stored in the cloud server 1, and the cloud server 1 may provide the web site of the service. In this case, the user terminal 3 can access the web site to utilize the application.

The controller 31 includes control devices such as a CPU, a ROM and a RAM. The CPU is a processor which executes various types of computation processing. The ROM previously stores control programs, such as a BIOS and an OS, for instructing the CPU to execute various types of processing. The RAM stores various types of information and is used as a temporary storage memory (workspace) for various types of processing executed by the CPU. The controller 31 causes the CPU to execute various types of control programs previously stored in the ROM or the storage 32 so as to control the user terminal 3.

Specifically, the controller 31 causes the operation display 33 to display various types of information and receives various types of user operations.

For example, the controller 31 causes the operation display 33 to display the setting page P1 (see FIGS. 3 and 6), the registration page P2 (see FIGS. 4 and 5), the management page P3 (see FIGS. 7 to 9) and the like. The controller 31 receives user operations in the setting page P1, the registration page P2 and the management page P3.

For example, the controller 31 causes the operation display 33 to display the login page P4 (see FIG. 10) so as to receive the login operation of the user. For example, the controller 31 causes the operation display 33 to display the service list page P5 (see FIG. 11) so as to receive an operation of selecting desired service from the user. For example, the controller 31 causes the operation display 33 to display the cooperative device page P6 (see FIG. 12) so as to display the NAS information such as the connection status of the NAS 2. For example, the controller 31 causes the operation display 33 to display the specific information page such as the search result page for the search request.

The user who sets and registers the NAS 2 is authorized to utilize the NAS 2. The user can utilize the user terminal 3 to utilize the service for acquiring the specific information of the NAS 2.

Setting Processing

Figure 13:
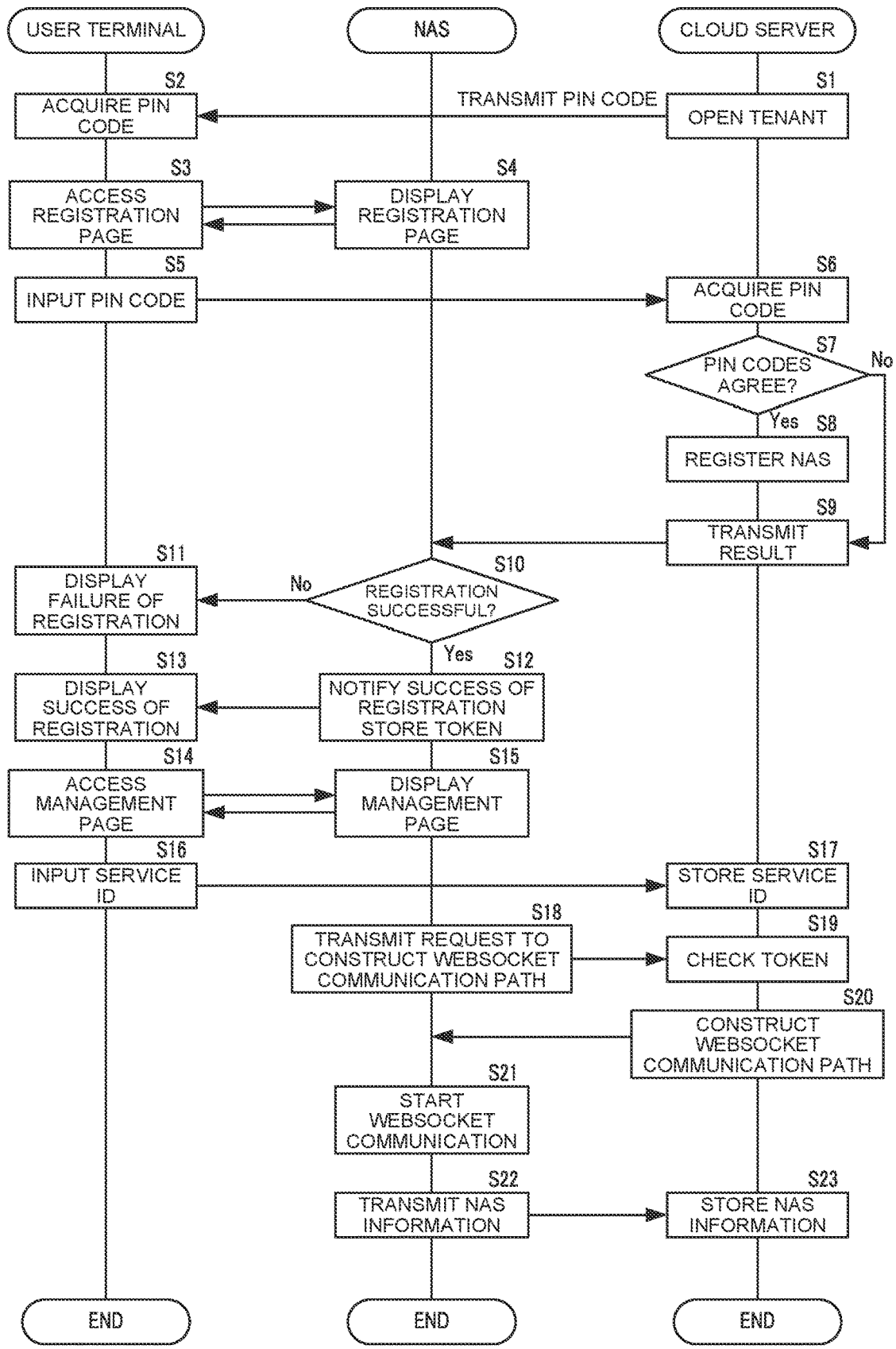
FIG. 13 is a flowchart for illustrating an example of a procedure of setting processing executed in the information processing system according to the embodiment of the present disclosure.

An example of a procedure for the setting processing executed in the information processing system 100 will be described below with reference to FIG. 13.

The present disclosure can be regarded as a disclosure of a setting method (an example of an information processing method in the present disclosure) for executing one or a plurality of steps included in the setting processing. The one or a plurality of steps included in the setting processing described here may be omitted as necessary. In the steps in the setting processing, the order in which the steps are executed may be different as long as the same operational effects are produced. Furthermore, although here, a case where the controller 11 of the cloud server 1, the controller 21 of the NAS 2 (the main body controller 211, the virtual controller 221) and the controller 31 of the user terminal 3 execute the steps in the setting processing will be described as an example, in another embodiment, the steps in the setting processing may be dispersed to one or a plurality of processors so as to be executed.

When in step S1, the user starts an operation of registering the NAS 2, the controller 11 of the cloud server 1 opens a tenant corresponding to one NAS 2. When the controller 11 opens the tenant, the controller 11 transmits a PIN code for registering the NAS 2 to the user terminal 3. In step S2, the controller 31 of the user terminal 3 acquires the PIN code from the cloud server 1.

When in step S3, the user selects the registration page of the NAS 2 in the setting page P1 (see FIG. 3), the controller 31 of the user terminal 3 requests the NAS 2 to transmit the data of the registration page P2. In step S4, the controller 21 of the NAS 2 transmits the data of the registration page P2 to the user terminal 3. In this way, the registration page P2 (see FIG. 4) is displayed in the user terminal 3.

In step S5, the user inputs the PIN code to the registration page P2 in the user terminal 3. When the controller 11 of the cloud server 1 acquires the PIN code from the user terminal 3 (S6), the controller 11 determines whether or not the PIN code acquired from the user terminal 3 agrees with the PIN code transmitted by the controller 11 to the user terminal 3 in step S1 (S7).

When the PIN code agrees with the PIN code (S7: yes), the controller 11 registers the NAS 2 as the tenant (S8) and transmits the result of the determination (agreement) in step S7 and a unique token (the first authentication information in the present disclosure) to the NAS 2 (S9). On the other hand, when the PIN code does not agree with the PIN code (S7: no), the controller 11 transmits the result of the determination (disagreement) in step S7 to the NAS 2 (S9). Step S8 is an example of a setting step in the present disclosure.

In step S10, the controller 21 of the NAS 2 determines, based on the result of the determination acquired from the cloud server 1, whether or not the registration of the NAS 2 is successful. When the registration of the NAS 2 is unsuccessful (S10: no), the controller 21 notifies the user terminal 3 of information indicating the failure of the registration. When the controller 31 of the user terminal 3 acquires the notification of the failure of the registration, the controller 31 displays, in the user terminal 3, the information indicating the failure of the registration (S11).

Figure 5:
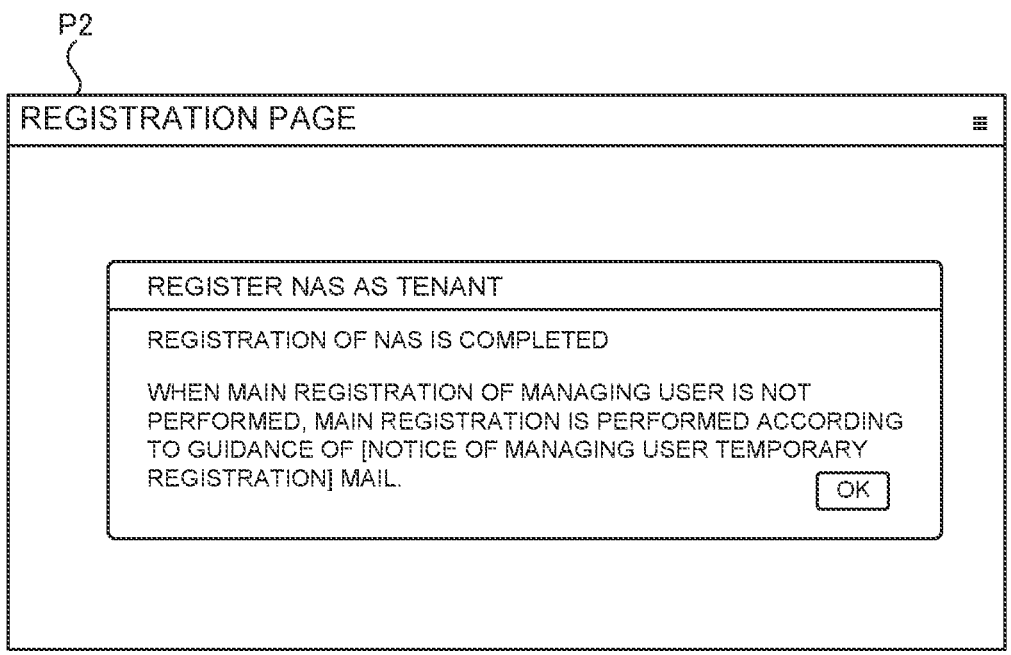
FIG. 5 is a diagram showing an example of the display screen of the user terminal in the embodiment of the present disclosure.
Figure 6:
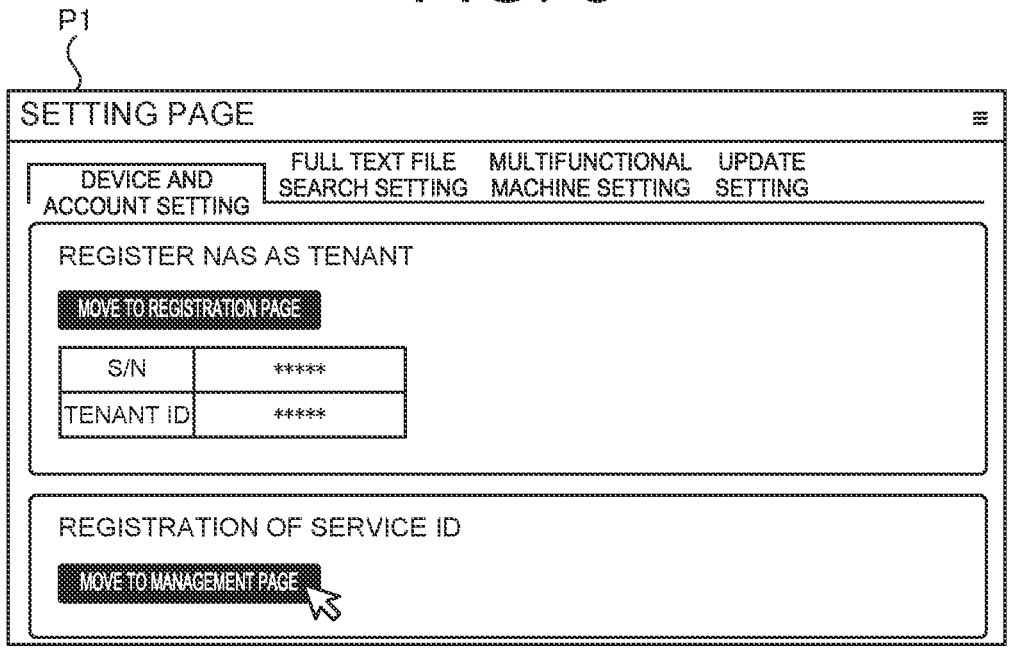
FIG. 6 is a diagram showing an example of the display screen of the user terminal in the embodiment of the present disclosure.

When the registration of the NAS 2 is successful (S10: yes), the controller 21 of the NAS 2 notifies the user terminal 3 of information indicating the success of the registration (S12). The controller 21 stores the token acquired from the cloud server 1 in the virtual storage 222 (S12). When the controller 31 of the user terminal 3 acquires the notification of the success of the registration, the information indicating the success of the registration such as the registration page P2 shown in FIG. 5 is displayed in the user terminal 3 (S13).

When in step S14, the user selects the management page of the NAS 2 in the setting page P1 (see FIG. 6), the controller 31 of the user terminal 3 requests the NAS 2 to transmit the data of the management page P3. In step S15, the controller 21 of the NAS 2 transmits the data of the management page P3 to the user terminal 3. In this way, the management page P3 (see FIG. 7) is displayed in the user terminal 3.

When in the management page P3 shown in FIG. 7, the user performs an operation of registering the service ID, the management page P3 shown in FIG. 8 is displayed in the user terminal 3. The user inputs the service ID in the management page P3 shown in FIG. 8. When the user inputs the service ID, the management page P3 shown in FIG. 9 is displayed in the user terminal 3. In the management page P3 shown in FIG. 9, the service ID and the NAS user name corresponding to the service ID are displayed. The controller 31 of the user terminal 3 transmits the service ID which is input and the NAS user name to the cloud server 1 (S16).

When the controller 11 of the cloud server 1 acquires the service ID and the NAS user name from the user terminal 3, the controller 11 stores them in the storage 12 (S17).

In step S18, the controller 21 of the NAS 2 uses the token acquired from the cloud server 1 to transmit, to the cloud server 1, the request to construct the WebSocket communication path between the cloud server 1 and the NAS 2.

In step S19, the controller 11 of the cloud server 1 checks the token included in the request to construct the WebSocket communication path against the token issued by the controller 11 to the NAS 2 in step S9. When the tokens agree with each other, the controller 11 constructs the WebSocket communication path (S20).

In step S21, the controller 21 of the NAS 2 starts WebSocket communication. In step S22, the controller 21 transmits the NAS information to the cloud server 1. When the controller 11 of the cloud server 1 acquires the NAS information from the NAS 2, the controller 11 stores it in the storage 12.

When the setting processing described above is completed, the user can, at the user terminal 3, utilize the service to receive the provision of information stored in the NAS 2.

Information Presentation Processing

Figure 14:
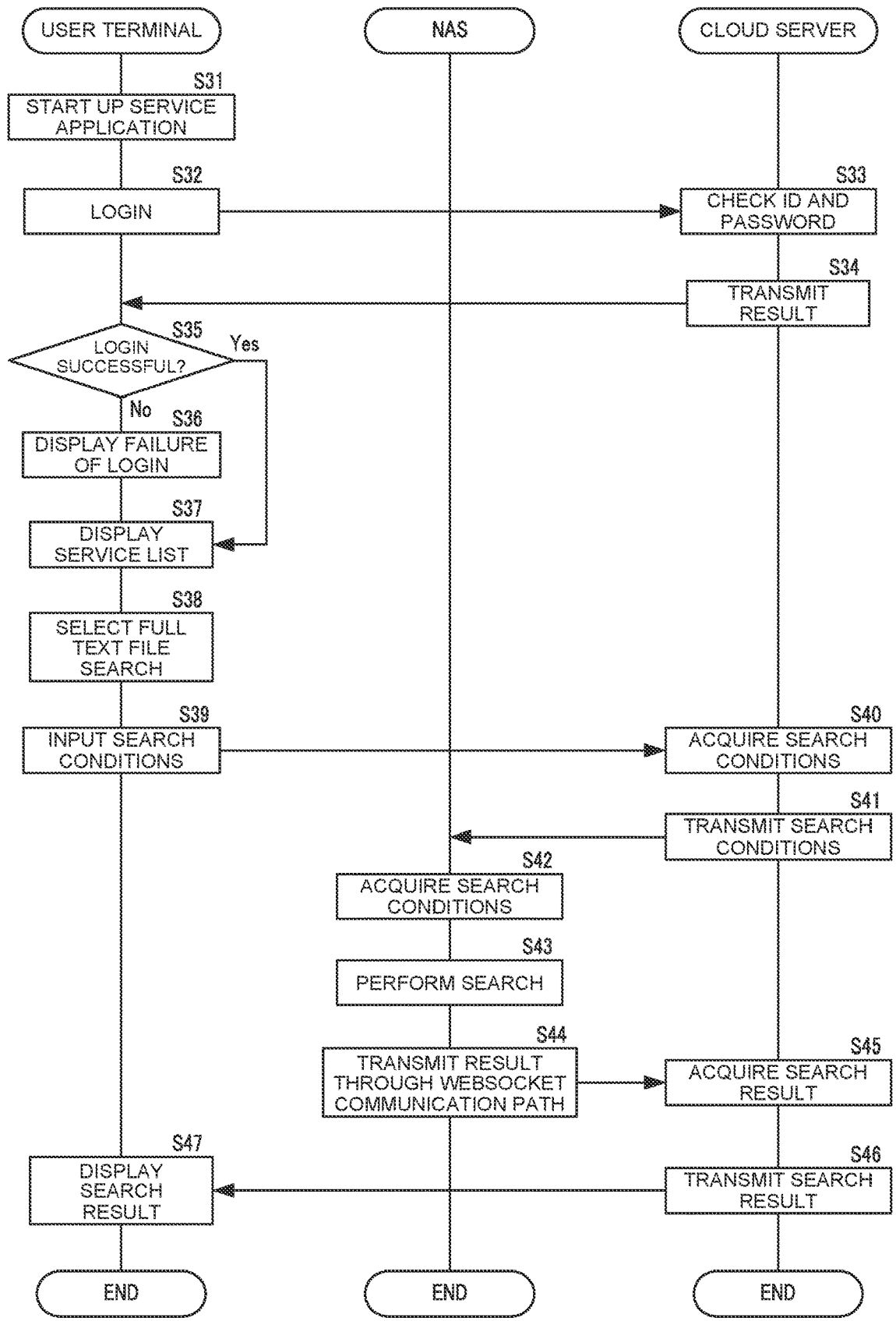
FIG. 14 is a flowchart for illustrating an example of a procedure of information presentation processing executed in the information processing system according to the embodiment of the present disclosure.

An example of a procedure for the information presentation processing executed in the information processing system 100 will be described below with reference to FIG. 14. The present disclosure can be regarded as a disclosure of an information presentation method (an example of the information processing method in the present disclosure) for executing one or a plurality of steps included in the information presentation processing. The one or a plurality of steps included in the information presentation processing described here may be omitted as necessary. In the steps in the information presentation processing, the order in which the steps are executed may be different as long as the same operational effects are produced. Furthermore, although here, a case where the controller 11 of the cloud server 1, the controller 21 of the NAS 2 (the main body controller 211, the virtual controller 221) and the controller 31 of the user terminal 3 execute the steps in the information presentation processing will be described as an example, in another embodiment, the steps in the information presentation processing may be dispersed to one or a plurality of processors so as to be executed.

In step S31, the user starts up the application of the service in the user terminal 3. In step S32, the user inputs the service ID and the password to the login page P4 displayed in the user terminal 3. When the controller 31 of the user terminal 3 acquires the service ID and the password, the controller 31 transmits them to the cloud server 1.

When the controller 11 of the cloud server 1 acquires the service ID and the password from the user terminal 3, the controller 11 checks the service ID and the password (S33), and transmits the result of the checking to the user terminal 3 (S34).

In step S35, the controller 31 of the user terminal 3 determines, based on the result of the checking acquired from the cloud server 1, whether or not the login is successful. When the login is unsuccessful (S35: no), the controller 31 displays information indicating the failure of the login in the user terminal 3 (S36). On the other hand, when the login is successful (S35: yes), the controller 31 displays the service list page P5 (see FIG. 11) in the user terminal 3 (S37).

In step S38, the user selects desired service in the service list page P5. Here, the user is assumed to select "full text file search". In step S39, the controller 31 acquires, in a search condition page (not shown), search conditions input by the user, and transmits them to the cloud server 1.

When the controller 11 of the cloud server 1 acquires the search conditions from the user terminal 3 (S40), the controller 11 transmits the search conditions to the NAS 2 (S41).

When the controller 21 of the NAS 2 acquires the search conditions from the cloud server 1 (S42), the controller 21 executes search processing based on the search conditions (S43). Specifically, the controller 21 extracts, from search data stored in the main body storage 212, search data which satisfies the search conditions. The controller 21 utilizes the WebSocket communication path to transmit the search data (search result) extracted from the main body storage 212 to the cloud server 1 (S44).

When the controller 11 of the cloud server 1 acquires the search result from the NAS 2 (S45), the controller 11 transmits the search result to the user terminal 3 (S46). Step S45 is an example of an acquisition step in the present disclosure, and step S46 is an example of a presentation step in the present disclosure.

When in step S47, the controller 31 of the user terminal 3 acquires the search result from the cloud server 1, the controller 31 displays the search result page in the user terminal 3.

In this way, the user terminal 3 can utilize the secure WebSocket communication path to acquire information stored in the NAS 2.

As described above, the information processing system 100 according to the present embodiment registers, based on the setting information acquired from the NAS 2 through the first communication path (for example, the HTTP communication path), the NAS 2 as the device capable of presenting the specific information to the user terminal 3. When the NAS 2 is registered, the information processing system 100 acquires the specific information corresponding to the request acquired from the user terminal 3 through the second communication path (for example, the WebSocket communication path) different from the first communication path, and presents the acquired specific information to the user terminal 3.

In the configuration described above, when the user registers the NAS 2 as the tenant, the WebSocket communication path is automatically constructed between the NAS 2 and the cloud server 1. In this way, it is possible to perform secure communication without constructing an environment such as the opening of the port of a router or the introduction of security software. For example, when a file search is received from the user, the cloud server 1 acquires file data from the NAS 2 through the WebSocket communication path and causes the user terminal 3 to display the file data.

As described above, since in the information processing system 100, it is not necessary to use a device such a router and to perform security measures such as security software, the cost is prevented from being increased, and moreover, the security of the information (such as file data) stored in the NAS 2 is retained, with the result that it is possible to present the information to the user terminal 3.

Here, when the user selects "cooperative device" in the service list page P5, the controller 31 of the user terminal 3 transmits a request for the information (NAS information) of a cooperative device (here, the NAS 2) to the cloud server 1.

When the controller 11 of the cloud server 1 acquires the request for the NAS information from the user terminal 3, the controller 11 transmits the request to the NAS 2. When the controller 21 of the NAS 2 acquires the request from the cloud server 1, the controller 21 utilizes the WebSocket communication path to transmit the NAS information stored in the main body storage 212 to the cloud server 1.

When the controller 11 of the cloud server 1 acquires the NAS information from the NAS 2, the controller 11 transmits the NAS information to the user terminal 3. When the controller 31 of the user terminal 3 acquires the NAS information from the cloud server 1, the controller 31 displays the cooperative device page P6 (see FIG. 12) including the NAS information in the user terminal 3. When the NAS 2 is in a state where the NAS 2 can normally perform data communication, "connected" is displayed in "connection status" of the cooperative device page P6. When the NAS 2 is disconnected in the network or power is interrupted, "disconnected" is displayed in "connection status" of the cooperative device page P6.

Although in the embodiment described above, the information processing system 100 corresponds to an information processing system in the present disclosure, the information processing system in the present disclosure is not limited to the information processing system 100. For example, the information processing system in the present disclosure may be formed with a single cloud server 1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing system that presents specific information stored in a storage device to a user terminal, the information processing system comprising:
   a setting circuit that registers, based on setting information acquired from the storage device through a first communication path, the storage device as a storage device capable of presenting the specific information to the user terminal;
   an acquisition circuit that acquires, when the storage device is registered by the setting circuit, the specific information corresponding to a request acquired from the user terminal, through a second communication path different from the first communication path;
   a presentation circuit that presents the specific information acquired by the acquisition circuit to the user terminal; and
   a communication circuit that:
      issues, when the storage device is registered by the setting circuit, first authentication information to the storage device,
      acquires, from the storage device, a request to construct the second communication path, and
      constructs the second communication path when second authentication information corresponding to the request to construct the second communication path agrees with the first authentication information.

2. The information processing system according to claim 1, further comprising:
   an authentication circuit that authenticates a user of the user terminal,
   wherein the acquisition circuit acquires, when the user is authenticated by the authentication circuit, the specific information through the second communication path.

3. The information processing system according to claim 1, further comprising:
   a server that is connected to the storage device,
   wherein the storage device includes:
   a system region that includes a storage which stores the setting information and the specific information; and
   a virtual machine that includes a first communicator which is connected to the first communication path and a second communicator which is connected to the second communication path, and
   the storage device transmits the setting information from the first communicator through the first communication path to the server and transmits the specific information from the second communicator through the second communication path to the server.

4. The information processing system according to claim 3,
   wherein the virtual machine further includes a second storage that stores first authentication information which is issued by the server and which is authenticated when the second communication path is constructed.

5. The information processing system according to claim 1,
   wherein the first communication path is a communication path corresponding to an Hyper Text Transfer Protocol (HTTP) communication protocol, and
   the second communication path is a communication path corresponding to a WebSocket communication protocol.

6. The information processing system according to claim 1,
   wherein the storage device is a Network attached storage (NAS).

7. The information processing system according to claim 1,
   wherein when an authentication code, input by a user, for registering the storage device agrees with an authentication code that has been transmitted to the user terminal, the communication circuit issues the first authentication information to the storage device, thereafter, upon inputting a predetermined password by the user, receives, from the storage device using the first communication path, a request to construct the second communication path including the second authentication information, and constructs the second communication path when the second authentication information issued to the storage device agrees with the first authentication information received from the storage device.

8. An information processing method that presents specific information stored in a storage device to a user terminal,
   wherein one or a plurality of processors execute:
   registering, based on setting information acquired from the storage device through a first communication path, the storage device as a storage device capable of presenting the specific information to the user terminal;
   acquiring, when the storage device is registered by, the specific information corresponding to a request acquired from the user terminal, through a second communication path different from the first communication path;
   presenting the acquired specific information to the user terminal;
   issuing, when the storage device is registered, first authentication information to the storage device;
   acquiring, from the storage device, a request to construct the second communication path; and
   constructing the second communication path when second authentication information corresponding to the request to construct the second communication path agrees with the first authentication information.

9. A non-transitory computer readable recording medium that records an information processing program which presents specific information stored in a storage device to a user terminal,
   wherein the recording medium records the information processing program for instructing one or a plurality of processors to execute:
   registering, based on setting information acquired from the storage device through a first communication path, the storage device as a storage device capable of presenting the specific information to the user terminal;
   acquiring, when the storage device is registered, the specific information corresponding to a request acquired from the user terminal; through a second communication path different from the first communication path;

presenting the acquired specific information to the user terminal;

issuing, when the storage device is registered, first authentication information to the storage device;

acquiring, from the storage device, a request to construct the second communication path; and constructing the second communication path when second authentication information corresponding to the request to construct the second communication path agrees with the first authentication information.

\* \* \* \* \*